(12) United States Patent
Heo et al.

(10) Patent No.: US 11,488,288 B1
(45) Date of Patent: Nov. 1, 2022

(54) METHOD AND APPARATUS FOR PROCESSING BLURRED IMAGE

(71) Applicant: AJOU UNIVERSITY INDUSTRY-ACADEMIC COOPERATION FOUNDATION, Suwon-si (KR)

(72) Inventors: Yong Seok Heo, Seoul (KR); Soo Hyun Jung, Suwon-si (KR); Tae Bok Lee, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/741,939

(22) Filed: May 11, 2022

(30) Foreign Application Priority Data

Jun. 2, 2021 (KR) .................. 10-2021-0071454

(51) Int. Cl.
*G06T 5/00* (2006.01)
*G06V 40/16* (2022.01)
*G06N 3/08* (2006.01)
*G06N 3/04* (2006.01)

(52) U.S. Cl.
CPC .......... *G06T 5/003* (2013.01); *G06N 3/0454* (2013.01); *G06N 3/088* (2013.01); *G06V 40/172* (2022.01); *G06T 2207/20081* (2013.01); *G06T 2207/20084* (2013.01)

(58) Field of Classification Search
CPC .......... G06T 5/003; G06T 2207/20081; G06T 2207/20084; G06N 3/0454; G06N 3/088; G06V 40/172
USPC ........................................ 382/100
See application file for complete search history.

(56) References Cited

U.S. PATENT DOCUMENTS

| | | | |
|---|---|---|---|
| 10,593,021 B1* | 3/2020 | Shen | G06T 5/003 |
| 2011/0090352 A1* | 4/2011 | Wang | H04N 5/23267 348/208.6 |
| 2015/0110415 A1* | 4/2015 | Wang | G06T 5/003 382/255 |
| 2016/0070979 A1* | 3/2016 | Xu | G06V 10/42 382/190 |
| 2019/0362199 A1* | 11/2019 | Lin | G06N 3/0454 |
| 2021/0049743 A1* | 2/2021 | Litwiller | G06T 7/0012 |
| 2021/0183020 A1* | 6/2021 | Gollanapalli | G06T 5/20 |
| 2022/0005160 A1* | 1/2022 | Anisimovskiy | G06T 7/248 |
| 2022/0156891 A1* | 5/2022 | Chi | G06N 3/08 |

* cited by examiner

*Primary Examiner* — Van D Huynh
(74) *Attorney, Agent, or Firm* — Sughrue Mion, PLLC

(57) ABSTRACT

Disclosed are a method and an apparatus for processing a blurred image. The method for processing a blurred image includes the steps of generating a first input feature map and a second input feature map with a feature distribution for blur removal from the blurred image, generating a prediction feature map from the first input feature map by using a self-spatial feature transform (SSFT) module which transforms the feature distribution for blur removal into a feature distribution for face recognition without external information, and generating a deblurred image based on the second input feature map and the prediction feature map.

12 Claims, 5 Drawing Sheets

SSFT module

SFT module

FIG. 5
Identifier
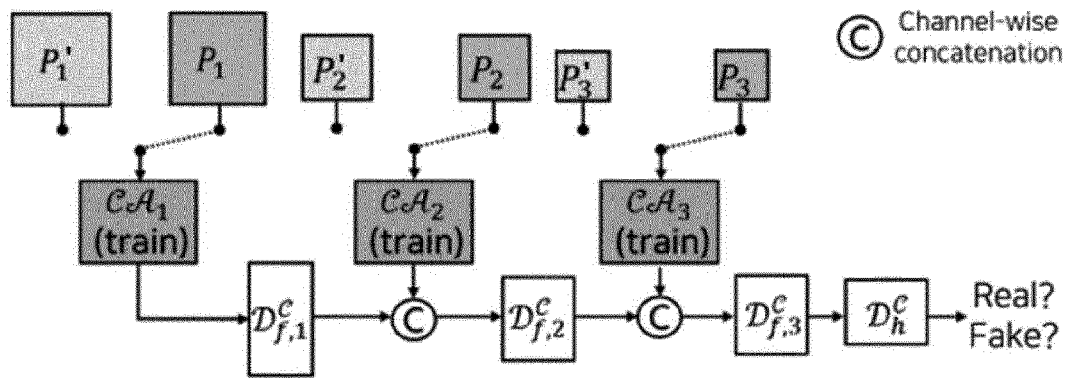
FIG. 6
| Method | Helen | | | | CelebA | | | |
|---|---|---|---|---|---|---|---|---|
| | PSNR(↑) | SSIM(↑) | $d_{VGG}$(↓) | LPIPS(↓) | PSNR(↑) | SSIM(↑) | $d_{VGG}$(↓) | LPIPS(↓) |
| Shen et al. [33] | 25.58 | 0.861 | 91.06 | 0.1527 | 24.34 | 0.860 | 117.50 | 0.1832 |
| Lu et al. [24] | 20.25 | 0.705 | 241.93 | 0.1654 | 19.96 | 0.742 | 305.96 | 0.1688 |
| Xia et al. [41] | 26.13 | 0.886 | 55.97 | 0.1052 | 25.18 | 0.892 | 68.05 | 0.1199 |
| Yasarla et al. [42] | 27.75 | 0.897 | 86.87 | 0.1086 | 26.62 | 0.908 | 66.33 | 0.1401 |
| Lee et al. [20] | 25.91 | 0.881 | 47.80 | 0.0828 | 24.91 | 0.885 | 57.54 | 0.0962 |
| DFPG-A (ours) | 27.70 | 0.911 | 42.84 | 0.0928 | 26.56 | 0.915 | 53.38 | 0.1052 |
FIG. 7
Input   Shen et al. [33]   Lu et al. [24]   Xia et al. [41]   Yasarla et al. [42]   Lee et al. [20]   DFPG-A (ours)   Ground Truth

METHOD AND APPARATUS FOR PROCESSING BLURRED IMAGE

CROSS-REFERENCE TO RELATED APPLICATIONS

This application claims the priority of Korean Patent Application No. 10-2021-0071454 filed on Jun. 2, 2021, in the Korean Intellectual Property Office, the disclosure of which is incorporated herein by reference.

BACKGROUND

Field

The present disclosure relates to a method and an apparatus for processing a blurred image.

Description of the Related Art

Deblurring means a technique of restoring an image blurred by motion to a clear image without the motion by controlling blurredness due to a blur.

A motion blurring phenomenon is a phenomenon caused by shaking of a camera for an exposure time of the camera or the motion of a captured object, as one of main causes of deteriorating the quality of the image.

The motion blurring phenomenon may frequently occur in a process of acquiring the image. Particularly, in the case of a face image where the motion frequently occurs, a motion blur frequently occurs, and in the face image with the motion blur, texture information is lost in addition to various information included in the face image.

Accordingly, since the motion blurring phenomenon largely deteriorates the performance of various face-related application algorithms such as face recognition, face alignment, and face detection, there is a need of technique of restoring the blurred image to be similar to a clear image without blurring by removing the blur.

SUMMARY

An object of the present disclosure is to provide a method and an apparatus for processing a blurred image capable of transforming a feature distribution by itself without external information using SSFT.

Another object of the present disclosure is to provide a method and an apparatus for processing a blurred image capable of generating a deblurred image similar to a ground truth by learning a prior information generator using a facial feature map including texture information of the face.

Yet another object of the present disclosure is to provide a method and an apparatus for processing a blurred image which extracts features to help blur removal in a feature distribution for face recognition to learn an identifier by applying a weight for each channel using a channel concentration module.

The objects of the present disclosure are not limited to the above-mentioned objects, and other objects and advantages of the present disclosure, which are not mentioned, will be understood through the following description, and will become apparent from the exemplary embodiments of the present disclosure. In addition, it will be easily appreciated that the objects and advantages of the present disclosure will be realized by means illustrated in the appended claims and combinations thereof.

An aspect of the present disclosure provides a method for processing a blurred image including the steps of generating a first input feature map and a second input feature map with a feature distribution for blur removal from the blurred image, generating a prediction feature map from the first input feature map by using a self-spatial feature transform (SSFT) module which transforms the feature distribution for blur removal into a feature distribution for face recognition without external information, and generating a deblurred image based on the second input feature map and the prediction feature map.

The prediction feature map may be generated by a prior information generator learned through a generative adversarial network (GAN).

The GAN may include the prior information generator, a face recognition module that generates a facial feature map including texture information of the face from the ground truth through the pre-learned face recognition module, and an identifier that inputs the prediction feature map or the facial feature map and identifies whether the input is the prediction feature map or the facial feature map.

The identifier may identify the input through steps of giving different weights for each channel to the prediction feature map and the facial feature map, processing an internal feature by concatenating the channels according to the weight, and classifying whether the input is the prediction feature map or the facial feature map according to a result of processing the internal feature.

The prior information generator may be learned based on a pixel loss calculated by calculating a pixel unit distance, an adversarial loss generated by competitive learning of the prior information generator and the identifier, and a prior loss calculated by calculating a distance according to the weight of the prediction feature map.

The generating of the deblurred image may include the steps of applying the prediction feature map used as prior information to the second input feature map using a spatial feature transform (SFT) module, and generating the deblurred image by transforming a feature distribution for face recognition into a feature distribution for blur removal with respect to the second input feature map applied with the prediction feature map.

Another aspect of the present disclosure provides apparatus for processing a blurred image including an encoder that generates a first input feature map and a second input feature map with a feature distribution for blur removal from the blurred image, a prior information generator that generates a prediction feature map from the first input feature map by using a self-spatial feature transform (SSFT) module which transforms the feature distribution for blur removal into a feature distribution for face recognition without external information, and a decoder that generates a deblurred image based on the second input feature map and the prediction feature map.

The prior information generator may be learned through a generative adversarial network (GAN).

The GAN may include a face recognition module that extracts a facial feature map including texture information of the face from the ground truth through the pre-learned face recognition module, and an identifier that inputs the prediction feature map or the facial feature map and identifies whether the input is the prediction feature map or the facial feature map.

The identifier may include a channel concentration module that gives different weights for each channel to the prediction feature map and the facial feature map, a processing module that processes an internal feature by concatenating the channels according to the weight, and a classification module that classifies whether the input is the prediction feature map or the facial feature map based on the output of the processing module.

The prior information generator may be learned based on a pixel loss calculated by calculating a pixel unit distance, an adversarial loss generated by a competitive relationship between the prior information generator and the identifier, and a prior loss calculated by calculating a distance according to the weight of the prediction feature map.

The decoder may generate the deblurred image by applying the prediction feature map used as prior information to the second input feature map using a spatial feature transform (SFT) module and transforming the feature distribution for face recognition to the feature distribution for blur removal with respect to the second input feature map applied with the prediction feature map.

According to an exemplary embodiment of the present disclosure, by the method and the apparatus for processing the blurred image, it is possible to transform a feature distribution by itself without external information using SSFT.

Further, it is possible to generate a deblurred image similar to a ground truth by learning a prior information generator using a facial feature map including texture information of the face.

Further, it is possible to extract features to help blur removal in a feature distribution for face recognition to learn an identifier by applying a weight for each channel using a channel concentration module.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which:

FIG. 5 is a schematic diagram of a channel concentration module in an exemplary embodiment of the present disclosure;

FIG. 6 is a table of comparing performance evaluation results between the apparatus for processing the blurred image according to the present disclosure and other apparatuses;

FIG. 7 is a diagram illustrating a deblurred image and a ground truth by the apparatus for processing the blurred image according to the present disclosure and other apparatuses.

DETAILED DESCRIPTION OF THE EMBODIMENT

Figure 1:
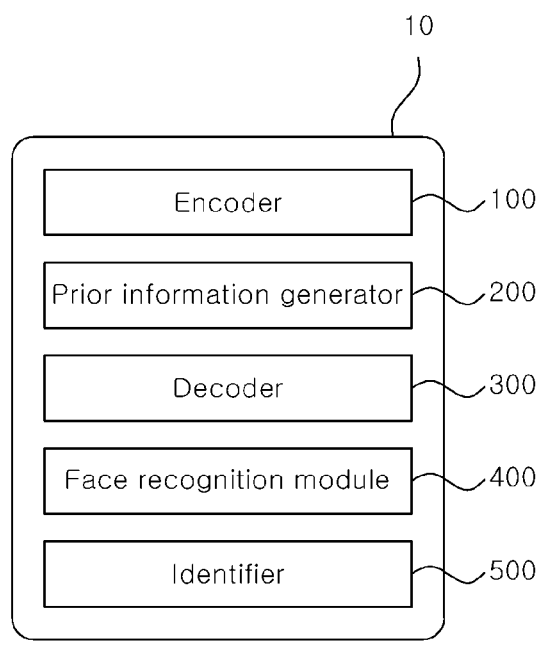
FIG. 1 is a schematic diagram of an apparatus for processing a blurred image according to an exemplary embodiment of the present disclosure.

The present disclosure may have various modifications and various embodiments and specific embodiments will be illustrated in the drawings and described in detail in the detailed description. However, the present disclosure is not limited to specific embodiments, and it should be understood that the present disclosure covers all the modifications, equivalents and replacements included within the idea and technical scope of the present disclosure. In describing each drawing, like reference numerals were used for like components.

Terms including as first, second, A, B, and the like are used for describing various components, but the components are not limited by the terms. The terms are used only to discriminate one component from the other component. For example, without departing from the scope of the present disclosure, a first component may be referred to as a second component, and similarly, the second component may be referred to as the first component. A term 'and/or' includes a combination of a plurality of associated disclosed items or any item of the plurality of associated disclosed items.

It should be understood that, when it is described that a component is "coupled" or "connected" to the other component, the component may be directly coupled or connected to the other component, but there may be another component therebetween. In contrast, it should be understood that, when it is described that a component is "directly coupled" or "directly connected" to the other component, no component is present therebetween.

Terms used in the present application are used only to describe specific exemplary embodiments, and are not intended to limit the present disclosure. A singular form may include a plural form unless otherwise clearly indicated in the context. The terms such as "comprising", or "having" specify the presence of stated features, integers, steps, operations, elements, and/or components, but do not exclude the presence or addition of one or more other features, integers, steps, operations, elements, components, and/or groups thereof.

Unless otherwise contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as ideal or excessively formal meanings unless otherwise defined in the present application.

Hereinafter, preferred exemplary embodiments of the present disclosure will be described in detail with reference to the accompanying drawings.

Figure 2:
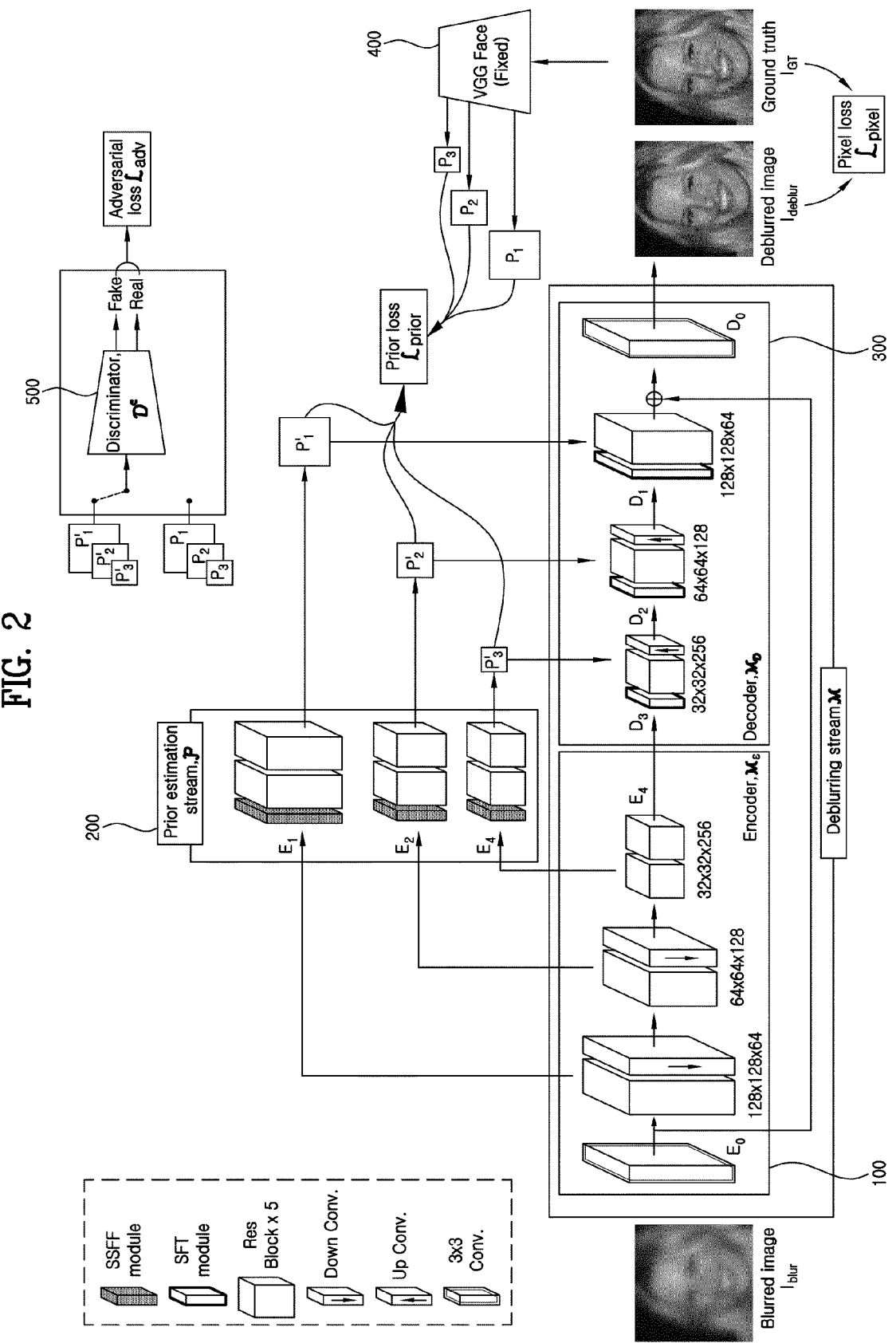
FIG. 2 is a diagram illustrating a process of processing a blurred image by the apparatus for processing the blurred image according to an exemplary embodiment of the present disclosure.
Figure 3:
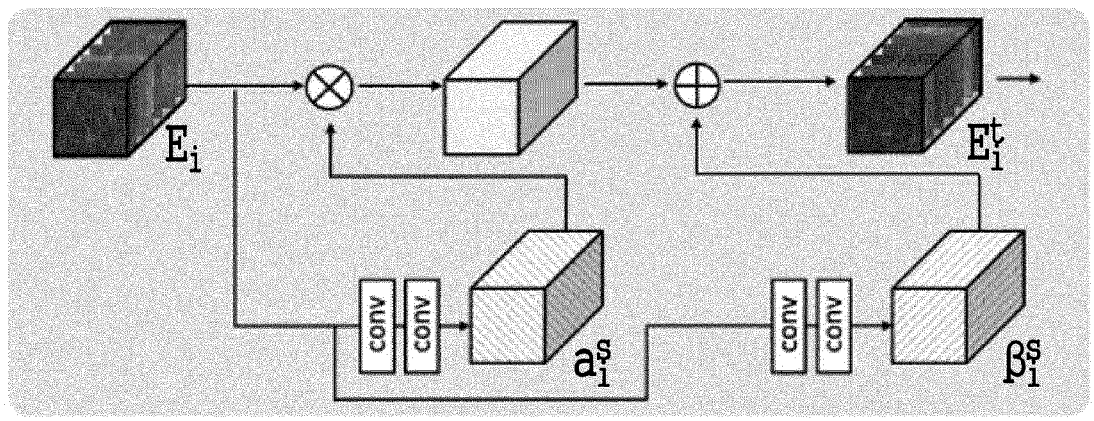
FIG. 3 is a schematic diagram of an SSFT module in an exemplary embodiment of the present disclosure.
Figure 4:
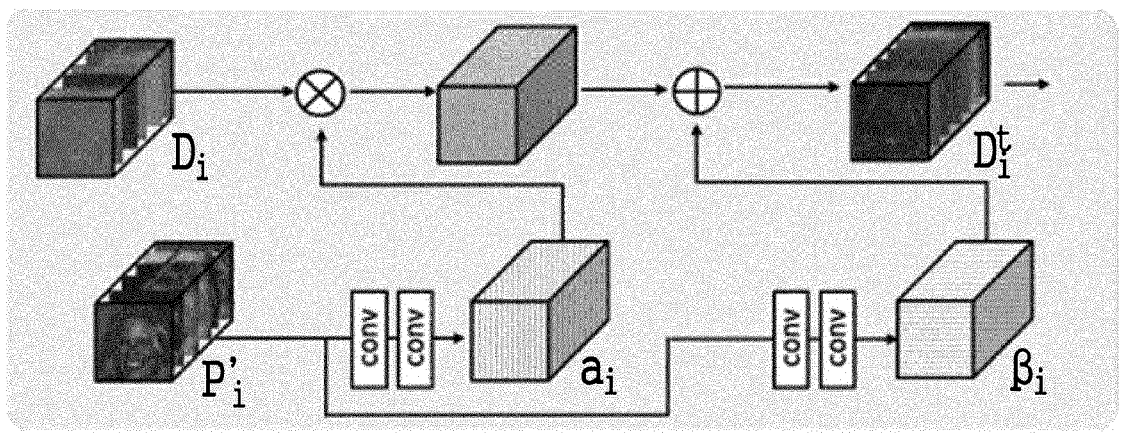
FIG. 4 is a schematic diagram of an SFT module in an exemplary embodiment of the present disclosure.

FIG. 1 is a schematic diagram of an apparatus for processing a blurred image according to an exemplary embodiment of the present disclosure, FIG. 2 is a diagram illustrating a process of processing a blurred image by the apparatus for processing the blurred image according to an exemplary embodiment of the present disclosure, FIG. 3 is a schematic diagram of an SSFT module in an exemplary embodiment of the present disclosure, FIG. 4 is a schematic diagram of an SFT module in an exemplary embodiment of the present disclosure, and FIG. 5 is a schematic diagram of a channel concentration module in an exemplary embodiment of the present disclosure. Hereinafter, an apparatus for processing a blurred image will be described with reference to FIGS. 1 to 5.

Referring to FIGS. 1 and 2, an apparatus 10 for processing a blurred image is an apparatus of generating a deblurred image similar to a ground truth by removing a blur from a blurred image and includes an encoder 100, a prior information generator 200, a decoder 300, a face recognition module 400, and an identifier 500.

The encoder 100 generates a first input feature map and a second input feature map from the blurred image. That is, the encoder 100 extracts a feature for removing the blur from the blurred image to generate the first input feature map and the second input feature map with a feature distribution for blur removal.

Here, each input feature map may be expressed by E0, E1, E2, E3, and E4 as illustrated in the drawings. At this time, the first input feature map may include E1, E2, and E3 inputted to the prior information generator 200 to be described below and the second input feature map may include E0 and E4 inputted to the decoder 300.

Accordingly, E1, E2, and E3 which are sequentially applied with down convolution (Down Conv.) from the blur image are input to the prior information generator 200.

The prior information generator 200 generates a prediction feature map from the first input feature map generated in the encoder 100. Specifically, the prior information generator 200 generates the prediction feature map from the first input feature map by using a self-spatial feature transform (SSFT) module.

The SSFT module transforms a feature distribution for blur removal of the first input feature map into a feature distribution for face recognition without external information. That is, the SSFT module transforms the feature distribution of the first input feature map by itself without additional information.

Even in the features extracted from the same blurred image, the feature distribution for blur removal and the feature distribution for face recognition may be different from each other. Further, for learning of the prior information generator 200, the feature distribution for face recognition is required.

Accordingly, the prior information generator 200 generates a prediction image by transforming the first input feature map having the feature distribution for blur removal into the feature distribution for face recognition by using the SSFT module to extract a deep prior feature from the blurred image. The prediction images generated herein may be $P_1'$, $P_2'$, and $P_3'$ corresponding to the first input feature maps $E_1$, $E_2$, and $E_3$, respectively.

Referring to FIG. 3, the SSFT module transforms an input $E_i$ (I=1, 2, 3) to $E_i^t$ through affine transformation of a pixel unit. At this time, the SSFT module uses a pair of affine transformation parameters $(\alpha_i^s, \beta_i^s)$.

The process of outputting $E_i^t$ affine-transformed from the input $E_i$ illustrated in FIG. 3 may be expressed by the following Equation 1.

<Equation 1>

$$E_i^t = SSFT_i(E_i | a_i^s, B_i^s) = a_i^s \otimes E_i + B_i^s$$

Here, $\otimes$ represents multiplication for each element. Further, the affine transformation parameter $a_i^s$ refers to a scale parameter and $B_i^s$ refers to a shift parameter, respectively, wherein $a_i^s$ and $B_i^s$ have the same size as the input $E_i$.

As such, $E_i^t$ transformed by the SSFT module is input to Resblocks included in the prior information generator 200 and the prior information generator 200 generates the prediction feature maps $P_1'$, $P_2'$, and $P_3'$ through the Resblocks.

The decoder 300 generates a deblurred image based on the second input feature map and the prediction feature maps $P_1'$, $P_2'$, and $P_3'$ generated from the prior information generator 200.

That is, the decoder 300 generates the deblurred image by using the prediction feature maps $P_1'$, $P_2'$, and $P_3'$ as the prior information using a spatial feature transform (SFT) module and transforming the feature distribution for face recognition into the feature distribution of blur removal from the second input feature maps $E_0$ and $E_4$ applied with the prediction feature map. Thus, a deblurred image $I_{deblur}$ has a relationship such as $I_{deblur}$=decoder ($E_0$, $E_4$, P').

Referring to FIG. 4, when the second input feature map $E_i$ is input to the decoder 300, an input $D_I$ having a deblurring function is used as an input. The input $D_i$ may be transformed into $D_i^t$ through affine transformation.

At this time, the SFT module may not perform transformation without external information unlike the SSFT module. Thus, the SFT module uses the prediction feature map $P_i'$ as prior information to apply the prediction feature map to the input $D_I$ and then performs the transformation.

The process of outputting $D_i^t$ affine-transformed from the input $D_i$ illustrated in FIG. 4 may be expressed by the following Equation 2.

<Equation 2>

$$D_i^t = SFT_i(D_i | a_i, B_i) = a_i \otimes D_i + B_i$$

Here, $\otimes$ represents multiplication for each element. Further, the affine transformation parameter $a_i^s$ refers to a scale parameter and $B_i^s$ refers to a shift parameter, respectively, wherein $a_i^s$ and $B_i^s$ have the same size as the input $D_i$.

As described above, the $D_i^t$ transformed by the SFT module is input to Resblocks included in the decoder 300 and the decoder 300 generates a deblurred image through the Resblocks.

On the other hand, the prior information generator 200 may be learned through a generative adversarial network (GAN) which is unsupervised learning, to generate a prediction feature map. That is, since the prior information generator 200 is repeatedly learned through GAN, it is possible to increase a possibility that the deblurred image similar to the ground truth may be generated as the learning may be performed.

Here, the GAN may further include the face recognition module 400 and the identifier 500 as well as the prior information generator 200.

The face recognition module 400 generates a facial feature map that includes texture information of the face from the ground truth through the pre-learned face recognition module. That is, the face recognition module 400 generates the facial feature map from the ground truth through a process of finding a facial region from the ground truth as the face image and finding and normalizing features of the face for each region such as eyes, nose, and the like. Here, the pre-learned face recognition module 400 may be a VGG face module.

The identifier 500 inputs a prediction feature map or a facial feature map and identifies whether the input is the prediction feature map or the facial feature map. More specifically, the apparatus 10 for processing the blurred image alternately inputs the prediction feature map or facial feature map to the identifier 500 to train the identifier 500. The identifier 500 may include a channel concentration module, a processing module, and a classification module.

Referring to FIG. 5, a channel concentration module $CA_i$ gives a different weight for each channel to the prediction feature map $P_i'$ and the facial feature map $P_i$. Since the facial feature map generated by the face recognition module consists of features for face recognition, the features may not be valid features in terms of deblurring of removing the blur. Thus, the channel concentration module gives a weight to a channel having valid features for blur removal for each channel among the channels of the prediction feature map and the facial feature map. The size of the given weight may vary depending on the number of valid features.

The processing module $D_{f,i}^c$ (i=1, 2, 3) concatenates the channels according to the given weight to process internal features. That is, the processing module concatenates only the channels having a weight of a predetermined value or more to process the internal features.

The classification module $D_h^c$ classifies whether the input is a prediction feature map or the facial feature map according to a result of processing the internal features to identify the input. An output $D^c(\mathbb{P})$, which is the identification result by the classification module, may be calculated by the following Equation 3.

<Equation 3>

$$D^c(\mathbb{P}) = D_h{}^c(D_{f,3}{}^c(P'_2 \otimes D_{f,2}{}^c(P'_2 \otimes D_{f,1}{}^c(P'_1))))$$

Here, $D_{f,i}^c$ (i=1, 2, 3) represents a processing module, $D_h^c$ represents a classification module, $P_i'$(I=1, 2, 3) represents a prediction feature map, and $\otimes$ represents the multiplication for each element.

As such, when the channel concentration module of the present disclosure is used, the channels with valid features for blur removal (that is, face restoration) may be extracted from the feature map for face recognition by giving the weight, thereby improving the identification performance of the identifier 500.

The prior information generator 200 is learned based on a pixel loss, an adversarial loss, and a prior loss.

The pixel loss is a loss calculated by calculating a pixel unit distance and calculated by the following Equation 4.

<Equation 4>

$$L_{pixel} = ||I_{deblur} - I_{GT}||1$$

Here, $L_{pixel}$ refers to a pixel loss, $I_{deblur}$ refers to a deblurred image, $I_{GT}$ represents a ground truth, and $||I_{deblur} - I_{GT}||1$ refers to a pixel unit distance between the deblurred image and the ground truth.

The adversarial loss is a loss generated by a competitive relationship between the prior information generator 200 and the identifier 500. That is, the prior information generator 200 needs to generate a prediction feature map similar to the facial feature map to deceive the identifier 500, and the identifier 500 needs to accurately identify whether the input is the facial feature map or the prediction feature map, so that the adversarial loss is generated in this process. The adversarial loss is calculated by the following Equation 5.

<Equation 5>

$$L_{G,adv} = -\mathbb{E}[\log(D^c(\mathbb{P}))]$$

Here, $L_{G,adv}$ represents an adversarial loss, and $D^c(\mathbb{P})$ refers to an output of the identifier for the input of the prediction feature map.

The prior loss is a loss calculated by calculating a distance according to a weight of the prediction feature map. The prior loss is calculated by the following Equation 6.

$$\mathcal{L}_{prior} = \sum_{i=1}^{3} \mathcal{L}_{prior,i} = \sum_{i=1}^{3} \sum_{w=1}^{W} \sum_{h=1}^{H} ||P'_{hw,i} - \hat{P}'_{hw,i}||_2^2 \quad <\text{Equation 6}>$$

Here, $L_{prior}$ refers to a prior loss and $P'_{hw,i}$ and $\hat{P}'_{hw,i}$ refer to normalized features according to a channel axis for each spatial position.

As a result, a value obtained by adding the pixel loss, the adversarial loss, and the prior loss is a total loss, and the prior information generator 200 is learned in a direction of minimizing the total loss. The total loss may be expressed by Equation 7.

<Equation 7>

$$L_G = L_{pixel} + \lambda_{G,adv} L_{G,adv} + \lambda_{prior} L_{prior}$$

Here, $L_G$ represents a total loss, and $\lambda_{G,adv}$ and $\lambda_{prior}$ are hyperparameters and have generally 0.05 and 1, respectively.

As such, the apparatus 10 for processing the blurred image learns the prior information generator 200 and the identifier 500 using the GAN. The apparatus 10 for processing the blurred image may learn the prior information generator 200 to generate a prediction feature map including high-level texture information of the face as well as overall structure information of the face in the blurred image and generate a deblurred image close to the ground truth by using the prediction feature map as the prior information.

Further, the apparatus 10 for processing the blurred image learns the identifier 500 through the channel concentration module to accurately identify the input through the channel having valid features for the blur removal (that is, face restoration) in the feature map for face recognition.

FIG. 6 is a table of comparing performance evaluation results between the apparatus for processing the blurred image according to the present disclosure and other apparatuses.

Referring to FIG. 6, results for performance evaluation are illustrated with respect to DFPG-A as the apparatus 10 for processing the blurred image and other deblurring apparatuses of Shen at al., Lu et al., Xia et al., Yasarla et al., and Lee et al.

Here, as evaluation criteria, a peak signal-to-noise ratio (PSNR) and a structural similarity index measure (SSIM) were used, and $d_{VGG}$ as a feature distance value in VGG Face and LPIPS for measuring perception image patch similarity were used. In the table, a part marked in a bold number means the best performance and a number including an underline means second better performance.

In FIG. 6, the apparatus 10 for processing the blurred image had the highest performance among listed deblurring devices with second and first highest values in PSNR and SSIM and first and second lowest values (distance values) in $d_{VGG}$ and LPIPS, respectively.

FIG. 7 is a diagram illustrating a deblurred image and a ground truth by the apparatus for processing the blurred image according to the present disclosure and other apparatuses.

Referring to FIG. 7, when a blurred image is inputted, the apparatus 10 for processing the blurred image generated a deblurred image DFPG-A most similar to a ground truth.

When deblurred images generated by other deblurring apparatuses of Shen at al., Lu et al., Xia et al., Yasarla et al., and Lee et al. are compared with the blurred image, the blurredness was somewhat removed, but there is a significant difference as compared to the ground truth. However, it can be seen that the deblurred image DFPG-A generated from the apparatus 10 for processing the blurred image is generated to be very similar to the ground truth.

Figure 8:
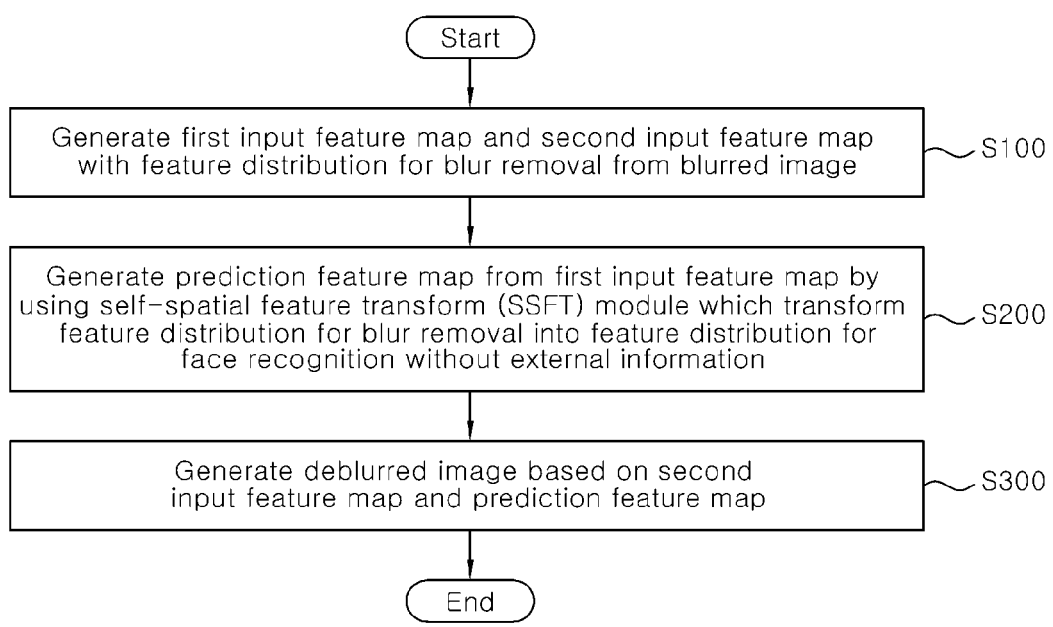
FIG. 8 is a flowchart of a method for processing a blurred image according to an exemplary embodiment of the present disclosure.

FIG. 8 is a flowchart of a method for processing a blurred image according to an exemplary embodiment of the present disclosure.

Referring to FIG. 8, in the method for processing the blurred image, a first input feature map and a second input feature map with a feature distribution for blur removal are generated from a blurred image (S100).

Thereafter, in the method for processing the blurred image, a prediction feature map is generated from the first input feature map by using a self-spatial feature transform (SSFT) module which transforms the feature distribution for blur removal into a feature distribution for face recognition without external information (S200).

Meanwhile, the prediction feature map is generated by a prior information generator learned through a generative adversarial network (GAN). The GAN includes a prior information generator, a face recognition module which generates a facial feature map including texture information of the face from the ground truth through the pre-learned face recognition module, and an identifier which inputs a prediction feature map or the facial feature map and identities whether the input is the prediction feature map or the facial feature map.

Finally, in the method for processing the blurred image, a deblurred image is generated based on the second input feature map and the prediction feature map (S300). Specifically, in the method for processing the blurred image, the deblurred image is generated through a step of applying the prediction feature map used as prior information to the second input feature map using a spatial feature transform (SFT) module and a step of transforming the feature distribution for face recognition into the feature distribution for blur removal with respect to the second input feature map applied with the prediction feature map.

As such, by the method and the apparatus for processing the blurred image according to an exemplary embodiment of the present disclosure, it is possible to transform a feature distribution by itself without external information using SSFT.

Further, it is possible to generate a deblurred image similar to a ground truth by learning a prior information generator using a facial feature map including texture information of the face.

Further, it is possible to extract features to help blur removal in a feature distribution for face recognition to learn an identifier by applying a weight for each channel using a channel concentration module.

As described above, the present disclosure has been described with reference to the illustrated drawings, but the present disclosure is not limited to the exemplary embodiments of the present disclosure and the drawings, and it will be apparent that various modifications can be made by those skilled in the art within the scope of the technical idea of the present disclosure. Further, it is natural that even through effects according to the configuration of the present disclosure are not explicitly described while describing the exemplary embodiments of the present disclosure above, expectable effects should be recognized by the configuration.

What is claimed is:

1. A method for processing a blurred image which generates a deblurred image similar to a ground truth by removing a blur from an input blurred image, comprising steps of:
   generating a first input feature map and a second input feature map with a feature distribution for blur removal from the blurred image;
   generating a prediction feature map from the first input feature map by using a self-spatial feature transform (SSFT) module which transforms the feature distribution for blur removal into a feature distribution for face recognition without external information; and
   generating a deblurred image based on the second input feature map and the prediction feature map.

2. The method for processing the blurred image of claim 1, wherein the prediction feature map is generated by a prior information generator learned through a generative adversarial network (GAN).

3. The method for processing the blurred image of claim 2, wherein the GAN includes the prior information generator;
   a face recognition module that generates a facial feature map including texture information of the face from the ground truth through the pre-learned face recognition module; and
   an identifier that inputs the prediction feature map or the facial feature map and identifies whether the input is the prediction feature map or the facial feature map.

4. The method for processing the blurred image of claim 3, wherein the identifier identifies the input through steps of:
   giving different weights for each channel to the prediction feature map and the facial feature map;
   processing an internal feature by concatenating the channels according to the weight; and
   classifying whether the input is the prediction feature map or the facial feature map according to a result of processing the internal feature.

5. The method for processing the blurred image of claim 4, wherein the prior information generator is learned based on a pixel loss calculated by calculating a pixel unit distance, an adversarial loss generated by competitive learning of the prior information generator and the identifier, and a prior loss calculated by calculating a distance according to the weight of the prediction feature map.

6. The method for processing the blurred image of claim 1, wherein the generating of the deblurred image includes steps of:
   applying the prediction feature map used as prior information to the second input feature map using a spatial feature transform (SFT) module; and
   generating the deblurred image by transforming the feature distribution for face recognition into the feature distribution for blur removal with respect to the second input feature map applied with the prediction feature map.

7. An apparatus for processing a blurred image which generates a deblurred image similar to a ground truth by removing a blur from an input blurred image, comprising:
   an encoder that generates a first input feature map and a second input feature map with a feature distribution for blur removal from the blurred image;
   a prior information generator that generates a prediction feature map from the first input feature map by using a self-spatial feature transform (SSFT) module which transforms the feature distribution for blur removal into a feature distribution for face recognition without external information; and
   a decoder that generates a deblurred image based on the second input feature map and the prediction feature map.

8. The apparatus for processing the blurred image of claim 7, wherein the prior information generator is learned through a generative adversarial network (GAN).

9. The apparatus for processing the blurred image of claim 8, wherein the GAN includes
   the prior information generator;

a face recognition module that extracts a facial feature map including texture information of the face from the ground truth through the pre-learned face recognition module; and an identifier that inputs the prediction feature map or the facial feature map and identifies whether the input is the prediction feature map or the facial feature map.

10. The apparatus for processing the blurred image of claim 9, wherein the identifier includes a channel concentration module that gives different weights for each channel to the prediction feature map and the facial feature map;

a processing module that processes an internal feature by concatenating the channels according to the weight; and a classification module that classifies whether the input is the prediction feature map or the facial feature map based on an output of the processing module.

11. The apparatus for processing the blurred image of claim 10, wherein the prior information generator is learned based on a pixel loss calculated by calculating a pixel unit distance, an adversarial loss generated by competitive learning of the prior information generator and the identifier, and a prior loss calculated by calculating a distance according to the weight of the prediction feature map.

12. The apparatus for processing the blurred image of claim 7, wherein the decoder generates the deblurred image by applying the prediction feature map used as prior information to the second input feature map using a spatial feature transform (SFT) module and transforming the feature distribution for face recognition into the feature distribution for blur removal with respect to the second input feature map applied with the prediction feature map.

* * * * *